US012643353B2

(12) United States Patent
Zhao

(10) Patent No.: US 12,643,353 B2
(45) Date of Patent: Jun. 2, 2026

(54) STRUCTURAL UNIT FOR EXPANSION FITTING IN VEHICLE FRAME COUPLER

(71) Applicant: WODE GLOBAL (QINGDAO) OUTDOOR CO.LTD, Qingdao (CN)

(72) Inventor: Yingchun Zhao, Qingdao (CN)

(73) Assignee: WODE GLOBAL (QINGDAO) OUTDOOR CO.LTD, Qingdao (CN)

( * ) Notice: Subject to any disclaimer, the term of this patent is extended or adjusted under 35 U.S.C. 154(b) by 504 days.

(21) Appl. No.: 18/135,177

(22) Filed: Apr. 16, 2023

(65) Prior Publication Data

US 2024/0157740 A1 May 16, 2024

(30) Foreign Application Priority Data

Mar. 7, 2023 (CN) .......................... 202320417624.8

(51) Int. Cl.
B60D 1/36 (2006.01)
B60D 1/52 (2006.01)

(52) U.S. Cl.
CPC . B60D 1/36 (2013.01); B60D 1/52 (2013.01)

(58) Field of Classification Search
CPC .. B60D 1/36; B60D 1/52; B60D 1/241; Y02T 10/40
See application file for complete search history.

(56) References Cited

U.S. PATENT DOCUMENTS

| | | | | |
|---|---|---|---|---|
| 5,730,456 A | * | 3/1998 | Bowers ..................... | B60D 1/60 |
| | | | | 280/495 |
| 6,598,897 B1 | * | 7/2003 | Patti ......................... | B60D 1/06 |
| | | | | 280/507 |
| 9,027,950 B2 | * | 5/2015 | Lahn ........................ | B60D 1/52 |
| | | | | 280/506 |

(Continued)

*Primary Examiner* — Valentin Neacsu
*Assistant Examiner* — Marlon A Arce
(74) *Attorney, Agent, or Firm* — Hawaii Patent Services; Nathaniel K. Fedde; Kenton N. Fedde

(57) ABSTRACT

The present application discloses a structural unit for expansion fitting in a vehicle frame coupler, and relates to the field of vehicle accessories. A technical solution involves: including a tubular body configured for insertion into a tube socket prepared in a towbar, the tubular body being hollow inside, and the tubular body being provided with through openings; an expansion member including two expanding blocks, the two expanding blocks being respectively arranged at openings of tube walls on two sides of the tubular body and both slidably connected to the openings of the tube walls; a driving assembly arranged at an end of the tubular body, and linked with the expansion member through a linkage assembly, to drive each of the expanding blocks to move towards an outer side of the tubular body; and the linkage assembly being arranged inside the tubular body. The present disclosure has the following beneficial effects. According to the solution, the tubular body is provided with movable expanding blocks, and as the tubular body is inserted into a square tube prepared in the towbar, the expanding blocks are driven, through the driving assembly, to move towards an (Continued)

outer side of the tubular body, so as to be pressed against an inner wall of the square tube prepared in the towbar, thereby improving tightness at the joint of the tubular body and realizing expansion fastening of connected structures.

15 Claims, 4 Drawing Sheets

(56)                    References Cited

U.S. PATENT DOCUMENTS

| | | | |
|---|---|---|---|
| 9,242,521 B2 * | 1/2016 | Columbia ................ | B60D 1/52 |
| 10,647,263 B2 * | 5/2020 | Viklund .................... | B60R 9/06 |
| 2011/0089669 A1 * | 4/2011 | Despres ................... | B60D 1/52 |
| | | | 29/525.01 |
| 2013/0193742 A1 * | 8/2013 | Eidsmore ................. | B60P 1/28 |
| | | | 298/12 |

* cited by examiner

STRUCTURAL UNIT FOR EXPANSION FITTING IN VEHICLE FRAME COUPLER

CROSS-REFERENCE TO RELATED APPLICATIONS

The present application claims the priority of Chinese patent application No. 202320417624.8, filed on Mar. 7, 2023, which is hereby incorporated by reference in its entirety.

TECHNICAL FIELD

The present disclosure relates to the field of vehicle accessories, and in particular, to a structural unit for expansion fitting in a vehicle frame coupler.

BACKGROUND

A vehicle frame coupler, when connecting a towbar, is required to be assembled by means of insertion into a reserved steel tube of the towbar and then fixed. An existing connection manner is generally to perform insertion first and then carry out a fixing process by using a pin rod, so as to prevent disengagement from a connection position. The steel tube prepared in the towbar is generally a square tube. Considering that a margin is required for mechanical fit during vehicle coupling, there may be a gap of about 1 mm left between an inner tube and an outer tube wall after the insertion into the tube socket(s) prepared in the towbar. As a result, a small degree of shaking may occur at the connection position(s) during use, which may adversely affect the service life of the structure herein.

SUMMARY

With respect to the deficiencies of the prior art, the present disclosure provides a structural unit for expansion fitting in a vehicle frame coupler, which solves the problem of insufficient tightening force heretofore due to existence of a connection gap when connecting a towbar.

In order to achieve the above objective, the present disclosure provides the following technical solution: a structural unit for expansion fitting in a vehicle frame coupler, including: a tubular body configured for insertion into a tube socket prepared in a towbar, the tubular body being hollow inside, and the tubular body being provided with through openings; an expansion member including two expanding blocks, the two expanding blocks being respectively arranged at openings of tube walls on two sides of the tubular body and both slidably connected to the openings of the tube walls;

a driving assembly arranged at an end of the tubular body, and linked with the expansion member through a linkage assembly, to drive each of the expanding blocks to move towards an outer side of the tubular body; and the linkage assembly being arranged inside the tubular body.

Preferably, the linkage assembly includes:

a screw rod rotatably arranged inside the tubular body and having one end extending to outside of the tubular body, and the end being connected to the driving assembly; and a driving block arranged at one end of the screw rod away from the driving assembly, and connected to the screw rod by thread; two sides of the driving block respectively abutting against one of the expanding blocks.

Preferably, a side of the driving block facing the expanding block is taken as a first lateral side, and a side of the expanding block facing the inside of the tubular body is taken as a second lateral side; and at least one of the first lateral side and the second lateral side is an inclined plane.

Preferably, the driving assembly includes:

a screwing member fixedly connected to an end of the screw rod.

Preferably, the driving assembly further includes:

a connection member sleeving the screw rod and located between the screwing member and an end of the tubular body; and a handle connected to the connection member.

Preferably, an anti-slip gasket is arranged between the connection member and the end of the tubular body.

Preferably, the connection member is hinged with one end of the handle.

Preferably, a tube wall of the tubular body is provided with a pin-hole.

Preferably, the tubular body is configured as a square tube, and when the handle bends to be folded relative to the connection member, the handle abuts against an outer side of the tubular body.

Preferably, the driving block includes:

a threaded portion connected to the screw rod by thread; and a pushing portion fixedly connected to the threaded portion, a space being left between the pushing portion and the threaded portion to accommodate the end of the screw rod, and the expanding blocks being arranged on two sides of the pushing portion.

Compared with the prior art, the present disclosure has the following beneficial effects. According to the solution, the tubular body is provided with movable expanding blocks, and as the tubular body is inserted into a square tube prepared in the towbar, the expanding blocks are driven, through the driving assembly, to move towards an outer side of the tubular body, so as to be pressed against an inner wall of the square tube prepared in the towbar, thereby improving tightness at the joint of the tubular body and realizing expansion fastening of connected structures.

Figure 1:
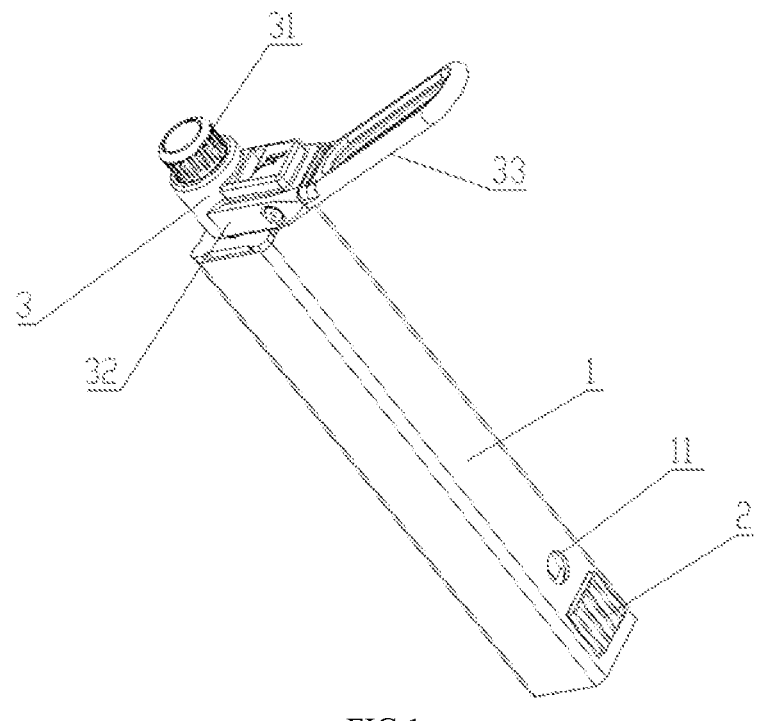
FIG. 1 is a schematic view of an overall configuration according to an embodiment of the present application.
Figure 2:
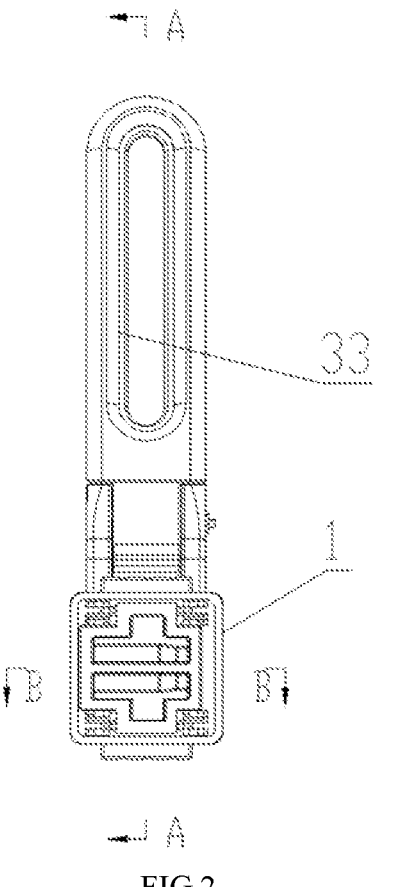
FIG. 2 is a bottom view according to an embodiment of the present application.

1: tubular body; 11: pin-hole; 2: expansion member; 21: expanding block; 3: driving assembly; 31: screwing member; 32: connection member; 33: handle; 4: linkage assembly; 41: screw rod; 42: driving block; 421: threaded portion; 422: pushing portion.

DETAILED DESCRIPTION

The technical solution according to the embodiments of the present disclosure will be clearly and completely described below with reference to the accompanying drawings shown the embodiments of the present disclosure. Apparently, the embodiment examples described are merely some rather than all of the embodiments of the present disclosure. All other embodiments obtained by those of ordinary skill in the art based on the embodiment examples in the present disclosure without creative efforts fall within the protection scope of the present disclosure.

Referring to FIG. 1 to FIG. 4, embodiments of the present disclosure provide the following technical solution.

A structural unit for expansion fitting in a vehicle frame coupler includes a tubular body 1. The tubular body 1 is configured for insertion into a tube socket prepared in a towbar, and is hollow inside. The tubular body is provided with through openings, namely, two open orifices symmetrically formed in a tube wall. The structural unit for expansion fitting further includes an expansion member 2. The expansion member 2 includes two expanding blocks 21. The two expanding blocks 21 are respectively arranged at openings of tube walls on two sides of the tubular body 1 and both slidably connected to the openings of the tube walls. A driving assembly 3 is arranged at an end of the tubular body 1, and a linkage assembly 4 is arranged inside the tubular body 1. The driving assembly 3 is linked with the expansion member 2 through the linkage assembly 4. In use, each of the expanding blocks 21 is driven by the driving assembly 3 to move towards an outer side of the tubular body 1. According to the present solution, a mechanical transmission mechanism formed by the driving assembly 3 and the linkage assembly 4 drives the expanding blocks 21 to move. After the tubular body 1 is inserted into the tube socket prepared in the towbar, the expanding blocks 21 are driven to move to the outer side of the tubular body 1, so as to be pressed against an inner wall of the tubular body 1 and improve tightness of connection of the tubular body.

On the basis of the above implementation solution, an anti-slip structure is arranged on an outer side of the expanding block 21. The anti-slip structure may be configured as a plurality of grooves, strip-shaped protrusions, bumps, teeth, or other structures, with a purpose of increasing friction force that can be applied by the expanding block 21 to the joint.

On the basis of the above implementation solution, the linkage assembly 4, as a whole, is configured as a mechanism of screw rod and threaded block, including a screw rod 41 rotatably arranged inside the tubular body 1. One end of the screw rod 41 extends to outside of the tubular body 1, and the end is connected to the driving assembly 3. The other end of the screw rod 41 is connected to the driving block 42 by thread. The driving block 42 cannot rotate under a limitation of an internal structure of the tubular body 1, and can slide along the inside of the tubular body 1. By rotating the screw rod 41, the driving block 42 can be driven to move axially along the screw rod. Two sides of the driving block 42 respectively abut against one of the expanding blocks 21. In use, the screw rod 41 is rotated by the driving assembly 3, thereby changing a position of the driving block 42, so as to enable the driving block to push, from the inside of the tubular body 1, the respective expanding block 21 to displace.

On the basis of the above implementation solution, a side of the driving block 42 facing the expanding block 21 is taken as a first lateral side, and a side of the expanding block 21 facing the inside of the tubular body 1 is taken as a second lateral side. At least one of the first lateral side and the second lateral side is an inclined plane. The displacement of the expanding block 21 can be realized by means of movement of the driving block 42 provided that one of the first lateral side and the second lateral side is an inclined plane.

Figure 3:
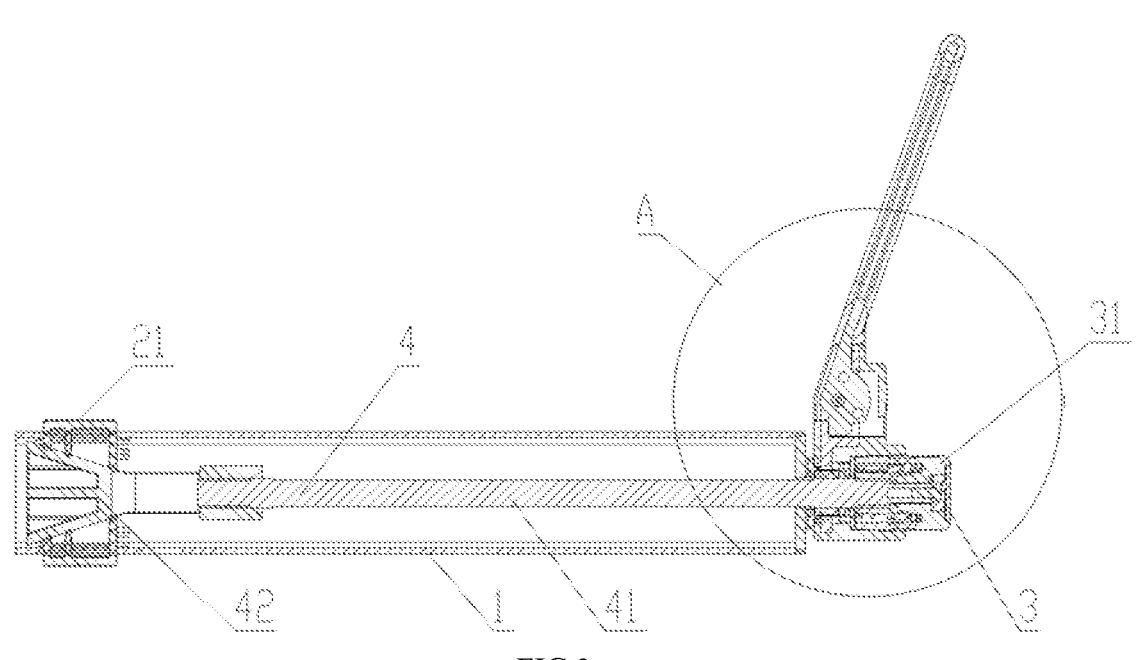
FIG. 3 is a sectional view taken along A-A in FIG. 2.
Figure 4:
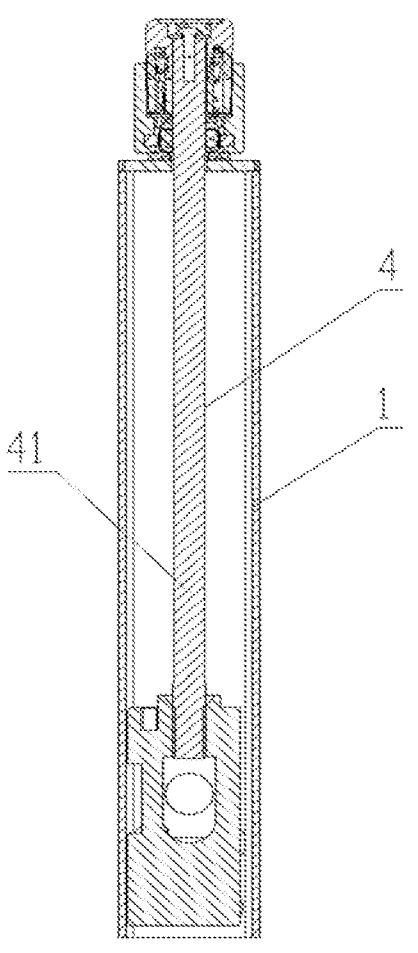
FIG. 4 is a sectional view taken along B-B in FIG. 2.
Figure 6:
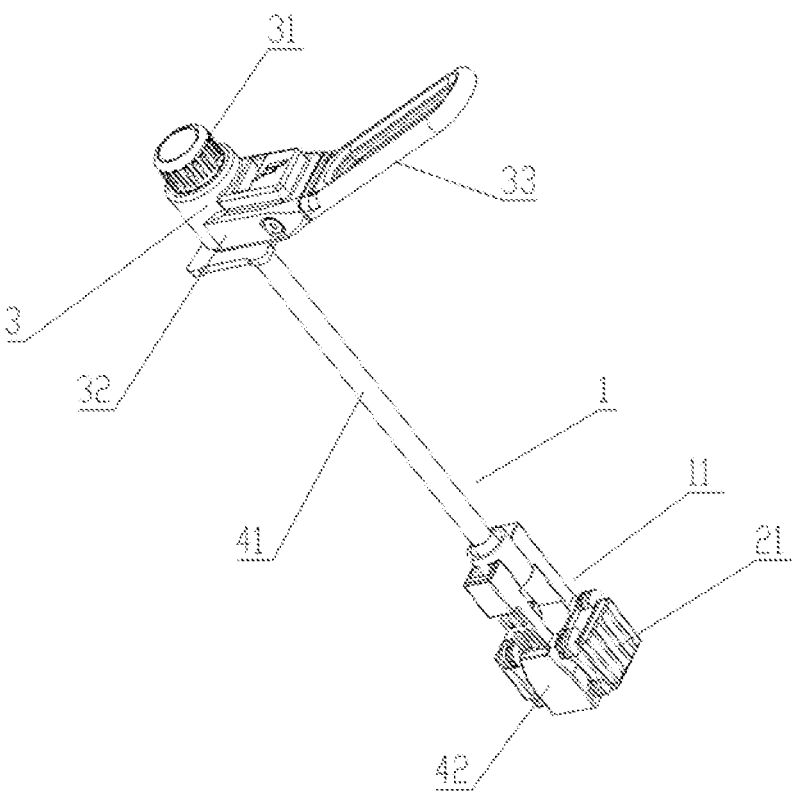
FIG. 6 is a schematic view similar to FIG. 1 in a state of the tubular body being hidden.
Figure 7:
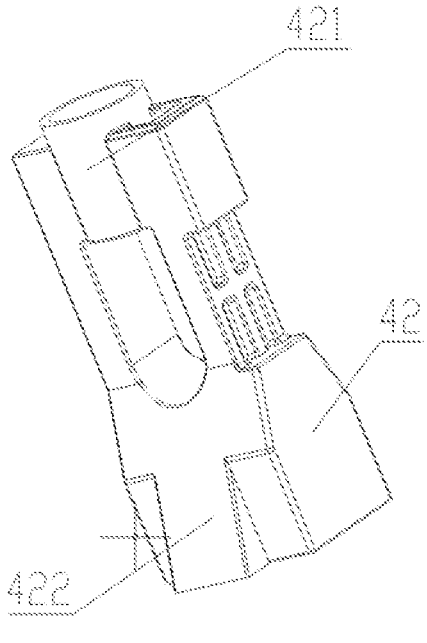
FIG. 7 is an enlarged view of a driving block according to an embodiment of the present application.

During implementation of the solution, as shown in FIG. 3, FIG. 6, and FIG. 7, an optimal solution is that both the first lateral side and the second lateral side are inclined planes and their slopes correspond to each other. In this way, the sides of the driving block 42 and the expanding block 21 can abut and fit better, which has a better effect on pushing and limiting the respective expanding block 21.

On the basis of the above implementation solution, the driving assembly 3 includes a screwing member 31 fixedly arranged at an end of the screw rod 41. The screwing member 31 is configured as a cover cap sleeving the end of the screw rod 41, and a plurality of anti-slip stripes are arranged on an outer wall of the screwing member 31. By rotating the screwing member 31, the screw rod 41 can be driven to rotate, thereby linking the respective expanding block 21 to realize expansion fastening of the tubular body 1.

On the basis of the above implementation solution, a cylindrical screwing shell sleeves the outer side of the end of the screw rod 41, and the screwing member 31 is nested inside the screwing shell and rotatably connected to the screwing shell. A position-limiting structure is arranged between the screwing member 31 and the screwing shell to prevent detachment of the screwing member 31 from the inside of the screwing shell. A spring is arranged between one side of the screwing member 31 facing the end of the tubular body 1 and a side of the screwing shell facing the screwing member 31. Such configuration can prevent an influence of extreme loosening of the screwing member 31 on the fixing of the screw rod 41.

On the basis of the above implementation solution, the driving assembly 3 further includes a connection member 32. A hexagonal structure may be selected for the configuration of the connection member 32, which sleeves a hexagonal part provided at the end of the screw rod 41. The connection member 32 is located between the screwing member 31 and an end of the tubular body 1. The connection member 32 is connected to a handle 33. By means of the screwing member 31 and the handle 33, the screwing member 31, when in use, can be firstly rotated by hand with fingers, so as to achieve a fast pre-tightening effect. After completion of pre-tightening, the handle 33 is gripped for continuous rotation, which facilitates application of greater force to the screw rod 41 and ensuring further improvement of an expansion fastening effect.

On the basis of the above implementation solution, an anti-slip gasket is arranged between the connection member 32 and the end of the tubular body 1. Through the arrangement of the anti-slip gasket, sliding of the connection member 32 can be prevented, thereby ensuring stability of the screw rod 41.

On the basis of the above implementation solution, the connection member 32 is hinged with one end of the handle 33. The tubular body 1 is configured as a square tube, and when the handle 33 bends to be folded relative to the connection member 32, the handle 33 abuts against an outer side of the tubular body 1. Through such a configuration, the handle 33, after being rotated in place, can be bent so as to abut on the outer wall of the tubular body 1, thereby better prevent loosening of the connection member 32.

Figure 5:
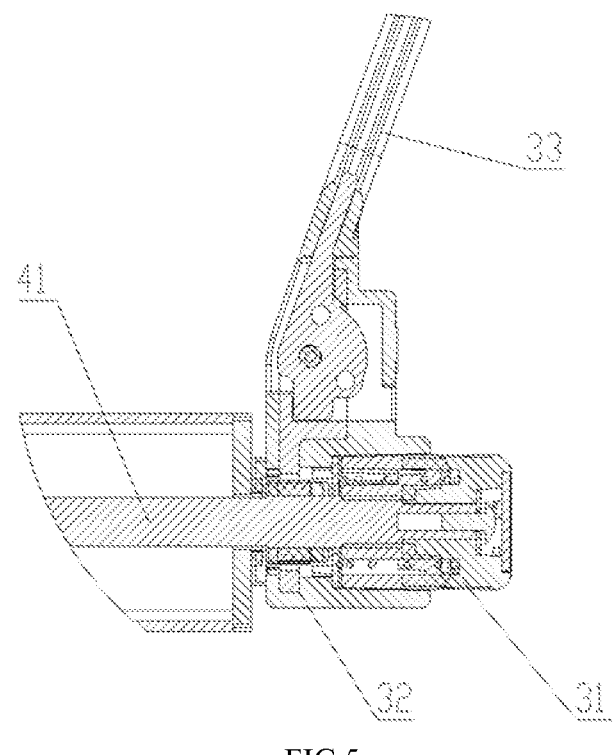
FIG. 5 is a partial enlarged view of A in FIG. 3.

As shown in FIG. 3 and FIG. 5, an operating state of the handle 33 is an inclined state of being at an obtuse angle with the outer wall of the tubular body 1, which is easier for an operator to exert force. A return spring, such as a torsion spring, may be arranged at a joint between the handle 33 and the connection member 32. Through the return spring, it is convenient to reset the operating state of the handle 33.

On the basis of the above implementation solution, a tube wall of the tubular body 1 is provided with a pin-hole 11. After initial insertion of the tubular body 1 into the towbar, a pin rod may be engaged with the pin-hole 11 firstly for performing general insertion and fixing. Then, tightening force is increased through the driving assembly 3, thereby further improving the stability of the connection.

On the basis of the above implementation solution, referring to FIG. 7, in a specific configuration of the driving block 42, it includes a threaded portion 421 and a pushing portion 422. The driving block 42 is connected to the screw rod 41 through the threaded portion 421. The threaded portion 421 is fixedly connected with the pushing portion 422, and a space is left between the pushing portion 422 and the threaded portion 421 to accommodate the end of the screw rod 41. The expanding blocks 21 are arranged on two sides of the pushing portion 422. When the screw rod 41 rotates, the end part of the screw rod 41 enters the space reserved between the threaded portion 421 and the pushing portion 422, and a respective side of the pushing portion 422 pushes the respective expanding block 21 to move.

Finally, it should be noted that the above are merely preferred embodiments of the present disclosure and are not intended to limit the present application. Although the present disclosure is described in detail with reference to the foregoing embodiments, those skilled in the art can still make modifications to the technical solution described in the foregoing embodiments, or make equivalent replacements to some or all of the technical features therein. Any modification, equivalent replacement, improvement, and the like made within the spirit and principle of the present disclosure shall all be included within the protection scope of the present application.

What is claimed is:

1. A structural unit for expansion fitting in a vehicle frame coupler, comprising:
   a tubular body configured for insertion into a tube socket prepared in a towbar, the tubular body being hollow inside, and the tubular body being provided with through openings;
   an expansion member comprising two expanding blocks, the two expanding blocks being respectively arranged at openings of tube walls on two sides of the tubular body and both slidably connected to the openings of the tube walls;
   a driving assembly arranged at an end of the tubular body, and linked with the expansion member through a linkage assembly, to drive each of the expanding blocks to move towards an outer side of the tubular body; and the linkage assembly being arranged inside the tubular body;
   wherein the linkage assembly comprises:
      a screw rod rotatably arranged inside the tubular body and having one end extending to outside of the tubular body, and the end being connected to the driving assembly; and
      a driving block arranged at one end of the screw rod away from the driving assembly, and connected to the screw rod by thread; two sides of the driving block respectively abutting against one of the expanding blocks; and
   wherein the driving block comprises:
      a threaded portion connected to the screw rod by thread; and a pushing portion fixedly connected to the threaded portion, a space being left between the pushing portion and the threaded portion to accommodate the end of the screw rod, and the expanding blocks being arranged on two sides of the pushing portion.

2. The structural unit for expansion fitting in a vehicle frame coupler according to claim 1, wherein a side of the driving block facing an expanding block of the two expanding blocks is taken as a first lateral side, and a side of the expanding block facing the inside of the tubular body is taken as a second lateral side; and
   at least one of the first lateral side and the second lateral side is an inclined plane.

3. The structural unit for expansion fitting in a vehicle frame coupler according to claim 1, wherein the driving assembly comprises:
   a screwing member fixedly connected to an end of the screw rod.

4. The structural unit for expansion fitting in a vehicle frame coupler according to claim 3, wherein the driving assembly further comprises:
   a connection member sleeving the screw rod and located between the screwing member and an end of the tubular body; and
   a handle connected to the connection member.

5. The structural unit for expansion fitting in a vehicle frame coupler according to claim 4, wherein an anti-slip gasket is arranged between the connection member and the end of the tubular body.

6. The structural unit for expansion fitting in a vehicle frame coupler according to claim 4, wherein the connection member is hinged with one end of the handle.

7. The structural unit for expansion fitting in a vehicle frame coupler according to claim 6, wherein the tubular body is configured as a square tube, and when the handle bends to be folded relative to the connection member, the handle abuts against an outer side of the tubular body.

8. The structural unit for expansion fitting in a vehicle frame coupler according to claim 1, wherein a tube wall of the tubular body is provided with a pin-hole.

9. The structural unit for expansion fitting in a vehicle frame coupler according to claim 8, wherein a side of the driving block facing an expanding block of the two expanding blocks is taken as a first lateral side, and a side of the expanding block facing the inside of the tubular body is taken as a second lateral side; and
   at least one of the first lateral side and the second lateral side is an inclined plane.

10. The structural unit for expansion fitting in a vehicle frame coupler according to claim 8, wherein the driving assembly comprises:
   a screwing member fixedly connected to an end of the screw rod.

11. The structural unit for expansion fitting in a vehicle frame coupler according to claim 10, wherein the driving assembly further comprises:
   a connection member sleeving the screw rod and located between the screwing member and an end of the tubular body; and
   a handle connected to the connection member.

12. The structural unit for expansion fitting in a vehicle frame coupler according to claim 11, wherein an anti-slip gasket is arranged between the connection member and the end of the tubular body.

13. The structural unit for expansion fitting in a vehicle frame coupler according to claim 11, wherein the connection member is hinged with one end of the handle.

14. A structural unit for expansion fitting in a vehicle frame coupler, comprising:

a tubular body configured for insertion into a tube socket prepared in a towbar, the tubular body being hollow inside, and the tubular body being provided with through openings;

an expansion member comprising two expanding blocks, the two expanding blocks being respectively arranged at openings of tube walls on two sides of the tubular body and both slidably connected to the openings of the tube walls;

a driving assembly arranged at an end of the tubular body, and linked with the expansion member through a linkage assembly, to drive each of the expanding blocks to move towards an outer side of the tubular body; and the linkage assembly being arranged inside the tubular body;

wherein the linkage assembly comprises:

a screw rod rotatably arranged inside the tubular body and having one end extending to outside of the tubular body, and the end being connected to the driving assembly; and a driving block arranged at one end of the screw rod away from the driving assembly, and connected to the screw rod by thread; two sides of the driving block respectively abutting against one of the expanding blocks;

wherein the driving assembly comprises:

a screwing member fixedly connected to an end of the screw rod;

wherein the driving assembly further comprises:

a connection member sleeving the screw rod and located between the screwing member and an end of the tubular body; and a handle connected to the connection member; and wherein an anti-slip gasket is arranged between the connection member and the end of the tubular body.

15. A structural unit for expansion fitting in a vehicle frame coupler, comprising:

a tubular body configured for insertion into a tube socket prepared in a towbar, the tubular body being hollow inside, and the tubular body being provided with through openings;

an expansion member comprising two expanding blocks, the two expanding blocks being respectively arranged at openings of tube walls on two sides of the tubular body and both slidably connected to the openings of the tube walls;

a driving assembly arranged at an end of the tubular body, and linked with the expansion member through a linkage assembly, to drive each of the expanding blocks to move towards an outer side of the tubular body; and the linkage assembly being arranged inside the tubular body;

wherein the linkage assembly comprises:

a screw rod rotatably arranged inside the tubular body and having one end extending to outside of the tubular body, and the end being connected to the driving assembly; and a driving block arranged at one end of the screw rod away from the driving assembly, and connected to the screw rod by thread; two sides of the driving block respectively abutting against one of the expanding blocks;

wherein the driving assembly comprises:

a screwing member fixedly connected to an end of the screw rod;

wherein the driving assembly further comprises:

a connection member sleeving the screw rod and located between the screwing member and an end of the tubular body; and a handle connected to the connection member;

wherein the connection member is hinged with one end of the handle; and wherein the tubular body is configured as a square tube, and when the handle bends to be folded relative to the connection member, the handle abuts against an outer side of the tubular body.

* * * * *